United States Patent [19]
Kizer et al.

[11] Patent Number: 6,065,689
[45] Date of Patent: May 23, 2000

[54] MIST GENERATING HEAD

[75] Inventors: Morgan A. Kizer, Charlotte, N.C.;
James V. Mitchell, Meadowview, Va.

[73] Assignee: Alemite Corporation, Charlotte, N.C.

[21] Appl. No.: 08/651,826

[22] Filed: May 21, 1996

[51] Int. Cl.$^7$ .................................................. B05B 9/00
[52] U.S. Cl. ........................ 239/126; 239/135; 184/55.1
[58] Field of Search ................................... 239/126, 135; 184/55.1, 58

[56] References Cited

U.S. PATENT DOCUMENTS

| | | | |
|---|---|---|---|
| 2,925,883 | 2/1960 | Everett | 184/55.1 X |
| 3,191,718 | 6/1965 | Haywood | 184/55.1 X |
| 3,211,255 | 10/1965 | Miyazaki | 184/55 |
| 3,478,843 | 11/1969 | Eckardt | 184/6 |
| 3,491,855 | 1/1970 | Obergefell et al. | 184/55 |
| 3,605,942 | 9/1971 | Lyth | 184/6.26 |
| 3,618,709 | 11/1971 | Boelkins | 184/6.4 |
| 3,709,433 | 1/1973 | Obergefell et al. | 239/8 |
| 4,335,804 | 6/1982 | Bardin et al. | 184/55.2 |
| 4,637,493 | 1/1987 | Ehlert | 184/55.1 |
| 4,940,185 | 7/1990 | Fu | 239/126 |
| 4,977,979 | 12/1990 | King, Sr. et al. | 184/15.1 |
| 5,042,618 | 8/1991 | Switalski et al. | 184/6.26 |
| 5,125,480 | 6/1992 | Gregory et al. | 184/6.26 |
| 5,332,064 | 7/1994 | Liu | 184/6.4 |
| 5,415,249 | 5/1995 | Grattan et al. | 184/6.26 |
| 5,427,203 | 6/1995 | Anspach, Jr. et al. | 184/6.26 |

OTHER PUBLICATIONS

Alemite Oil Mist Application Manual (Form 37–88).
Alemite Oil–Mit Automatic Lubrication System (Catalog 603).
Alemite/Stewart–Warner Service Instruction Manual (Ser 3760–A1, Sep. 1984).

*Primary Examiner*—Andres Kashnikow
*Assistant Examiner*—Steven J. Ganey
*Attorney, Agent, or Firm*—Moore & Van Allen, PLLC

[57] ABSTRACT

An apparatus for generating a mist for use in a centralized, pressurized gas-driven mist generating system is disclosed in which a frame member is formed with a mist generating passage, a pressurized gas inlet passage connecting with the mist generating passage, and a liquid inlet passage connecting with the mist generating passage. The mist generating passage is adapted to receive a gas-operated venturi nozzle having mist flow rates ranging from about 0.1 cfm to about 65 cfm. A pressure relief valve for relieving excess gas pressure is also disposed in the mist generating passage and adapted to open if the gas pressure in the mist generating system reaches a predetermined level. The mist generating apparatus further comprises an adjusting member, such as a needle valve, disposed in the liquid inlet passage and extending externally of the frame member to a position accessible for adjustive manipulation by an operator for controlling the liquid flow rate and adjusting the ratio of liquid-to-gas in the mist. A liquid supply tube, received in the liquid inlet passage of the frame member, a liquid heater and a liquid level detector are all part of the mist generating apparatus. An electrical conduit passing through the frame member for receiving and conveying power supply wires to the frame member and an electrical terminal strip fastened to the frame member for electrical connection requirements of the mist generating system are also provided. A reservoir is sealingly secured against the frame member for containing the liquid supply. A reservoir filling passage is formed in the frame member having an end opening into the reservoir and the other end opening externally of the frame member. For large reservoirs, a plurality of mounting ports for the frame member are provided for accommodating multiple heads for redundant or specialized functions.

37 Claims, 9 Drawing Sheets

MIST GENERATING HEAD

BACKGROUND

This invention relates generally to mist generating systems for atomizing liquids, such as for generating an oil mist for lubricating machine parts, and more particularly concerns a mist generating head for the same.

The physical structure in which mist generation occurs is referred to as a mist generating head. Means for pneumatic atomization of a liquid for generating a mist typically comprise nozzles fitting in the head and having an integral venturi or vortex chamber. Pressurized or compressed gas flows through the mist generating nozzle at near acoustic velocity. A reduced pressure region is created in the mist generating head drawing liquid into the nozzle from a liquid supply source. Gas and liquid are combined in the nozzle. The action of the turbulent stream of pressurized gas subjects the liquid to a condition of high stress, breaking down the liquid into extremely small and substantially uniform mist particles suspended in the gas stream. Larger particles fall out of the gas stream, leaving the smaller ones to remain air borne. A baffle is typically placed downstream of the nozzle outlet. The heaviest of the air borne liquid particles strike the baffle and fall out. The smaller mist particles can change direction and avoid the baffle. The gas stream transports the tiny liquid particles constituting the mist through a header system and delivers the particles to points of use.

Centralized mist generating systems are used to provide an oil mist for continuous lubrication of multiple pieces of equipment. Oil mist lubricating systems generally include a pressurized inlet gas supply, an inlet oil supply feeding into an oil reservoir, a mist generating head and instrumentation for monitoring and controlling the operating variables of the system. Using the energy of pressurized gas, oil is atomized into very fine particles at a central location. The oil mist is conveyed long distances in the gas stream and directed to machinery parts for lubrication. Oil mist lubrication is used to lubricate all kinds of machine elements ranging from tiny, ultra-high speed parts of dental drills to huge chains, cams, gears, bearings and other moving machine parts.

The heart of any oil mist lubricating system is the mist generating head. A basic mist generating head consists of a pressurized gas inlet, an oil inlet and a mist generating nozzle. However, oil mist generating heads are quite limited in the functions they perform. Present mist generating heads are typically designed based on the system capacity. Small oil mist generators do not use the same mist generating head as large generators. While nozzles having different mist generating capacities may be interchanged in a head, only slightly different amounts of oil mist can be generated by the head. High volume mist generating nozzles simply do not fit small mist generating heads.

Another problem with oil mist generating systems is the large number of component parts. Certain components of the oil mist lubricating system may be unitary with the mist head, such as an air pressure regulator, an inlet air pressure gauge or an oil reservoir filling port. However, oil heaters, float switches, associated instrumentation, etc., still remain as separate components. An operator of many different sizes of oil mist systems in a large facility is required to keep a large number of replacement parts on hand for service and maintenance of each of the systems.

From the standpoint of the oil mist lubricating system manufacturer, this problem is multiplied when an oil mist product line includes several different size systems. Many inventory items are required to maintain a product line and purchasing must be done on an as-needed basis in small quantities. Designing and manufacturing custom parts to meet a customer's changing needs cannot be accomplished without extraordinary efforts and costs, and is economically impractical.

Present oil mist lubricating systems are also difficult to service. Malfunctions often require shutting down the lubricating system and, in the absence of a redundant unit, the lubricated equipment. There are numerous parts which must be removed or disconnected. Problem diagnosis and repair further extends downtime. Since both the tank and head are rigidly mounted, even the simple task of cleaning an oil pickup screen inside the reservoir requires that various lines be disconnected and multiple head screws removed to access the screen. Productivity is sacrificed due to the time and labor involved in maintenance and repair.

Another problem with conventional oil mist lubrication systems is, once in place, there are few changes that can be made to a system. If the user wants to modify an existing system, such as change the tank size or increase system capacity for instance, there is little that can be done to adapt the system accordingly. Therefore, if the user's lubrication needs increase or decrease the only choice is to purchase and install a new system at significant additional expense.

For the foregoing reasons, there is a need for a mist generating head adapted for a wide range of sizes of mist generating systems. The mist generating head must be interchangeable with small and large mist generators. Ideally, the mist generating head components should also be fully interchangeable regardless of the mist generator capacity. The mist generating head should allow for more flexibility in configuring and adapting the system to the user's requirements. The new mist generating head needs to allow for an upgrade without completely upfitting or scrapping an existing unit. Further, the mist generating head should be easy to maintain and enable service to the system with a minimum of downtime. At the same time, the mist generating head needs to be straightforward and inexpensive to manufacture, and require a minimum of parts to produce and maintain.

SUMMARY

The present invention is directed to an apparatus for generating a mist for use in a centralized, pressurized gas-driven mist generating system that satisfies these needs. A mist generating apparatus having features of the present invention comprises a frame member having a mist generating passage, a pressurized gas inlet passage connecting with the mist generating passage and a liquid inlet passage connecting with the mist generating passage; means for generating mist disposed in the mist generating passage; and means for relieving excess gas pressure disposed in the mist generating passage. The excess gas pressure relief means comprises a pressure relief valve adapted to open if the gas pressure in the mist generating system reaches a predetermined level. The mist generating passage is adapted to receive mist generating means, such as a gas-operated venturi nozzle, having mist flow rates ranging from about 0.1 cfm to about 65 cfm.

The mist generating apparatus further comprises means for controlling the liquid flow rate for adjusting the ratio of liquid-to-gas in the mist. The liquid flow rate controlling means comprises an adjusting member, such as a needle valve, disposed in the liquid inlet passage and extending externally of the frame member to a position accessible for adjustive manipulation by an operator. A liquid supply tube, received in the liquid inlet passage of the frame member, a liquid heater and a liquid level detector are all part of the mist generating apparatus. An electrical conduit passing through the frame member for receiving and conveying power supply wires to the frame member and an electrical terminal strip fastened to the frame member for electrical connection requirements of the mist generating system are also provided.

A reservoir is sealingly secured against the frame member for containing the liquid supply. A reservoir filling passage is formed in the frame member having an end opening into the reservoir and the other end opening externally of the frame member. For large reservoirs, a plurality of mounting ports for the frame member are provided for accommodating multiple heads for redundant or specialized functions.

Accordingly, it is an object of the present invention to provide a new mist generating apparatus for use in a centralized mist generating system having one or more of the novel features of this invention as set forth above or hereinafter shown or described.

Another object of the present invention is to provide a mist generating head incorporating all of the basic functions that are required for producing a mist from a liquid.

Still another object of the present invention is provide a mist generating apparatus which is functional on mist generators spanning a broad of range of capacities.

Further, an object of the present invention is to provide a mist generating apparatus having interchangeable components, including mist generating nozzles wherein the nozzles generate low and high volume mists.

Still further an object of the present invention is to provide an oil mist generating system with a minimum of component parts. A related object of the present invention is to provide a mist generating head wherein the components of the oil mist lubricating system are unitary with the mist head. In particular, an object of the present invention is to minimize the number of replacement parts necessary for service and maintenance of the systems. Similarly, an object of the present invention is provide an oil mist lubricating system that is easy to service and maintain.

Finally, an object of the present invention is to provide a mist lubrication systems that can be significantly modified once in place, including oil mist volumetric flow rate and reservoir capacity.

A feature of the present invention is that the mist generating head is capable of operatively receiving a mist generating nozzle having mist outputs ranging from about 0.1 cfm to about 65 cfm. Another feature is that a liquid heater, level switch, pickup tube and pressure relief valve are all integral with the mist head. A further feature of the present invention is the mist generating head-to-reservoir connecting port geometry is identical for all size liquid reservoirs.

The mist generating head of the present invention can be used on small systems as well as large systems. The mist generating head offers a compact, easy to manufacture and versatile mist generating head. When an operator needs additional capacity, low output nozzles can be changed to high output nozzles. Small tanks can be replaced by big tanks. Since the heart of the system is all one piece, service and maintenance to the system is quick and easy. The operator simply removes the reservoir from the mist generating head and has access to all system components. Since the mist generating heads are all the same, a new head can replace a broken head and the system restarted. On multi-port reservoirs, redundant heads can be used. Finally, since the mist generating head and associated components are interchangeable across systems, the parts needed to be produced by the manufacturer and kept on hand by the operator are minimized.

BRIEF DESCRIPTION OF THE DRAWINGS

For a more complete understanding of this invention reference should now be had to the embodiments illustrated in greater detail in the accompanying drawings and described below.

In the drawings.

DESCRIPTION

Figure 1:
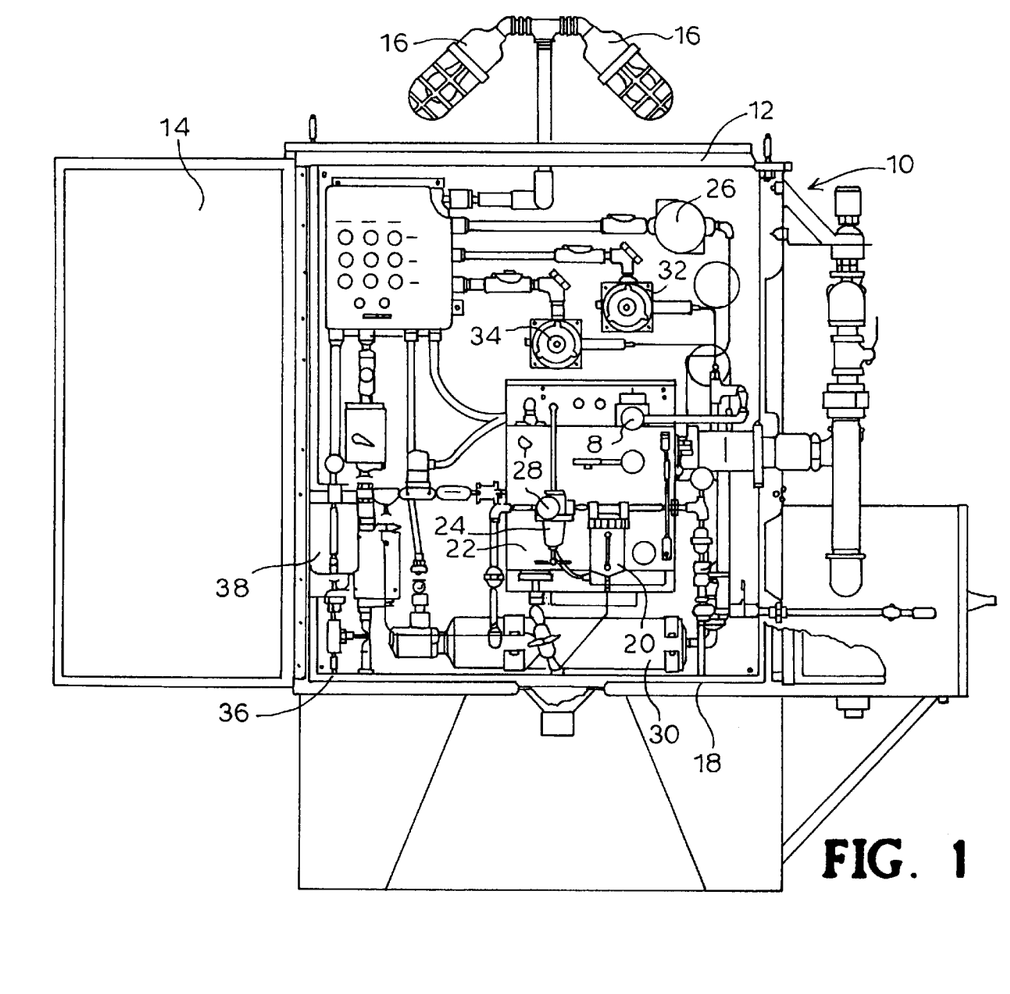
FIG. 1 is an elevational view of an oil mist lubricating system cabinet, housing the components of a conventional oil mist lubricating system.

Referring first to FIG. 1, there is shown a hazardous locations oil mist generating system, generally designated at 10, which is available from Alemite Corporation, Charlotte, N.C., U.S.A. All system components are housed within a steel cabinet 12. The cabinet 12 has weather-sealed doors 14 and is designed to be suitable for both an indoor and outdoor industrial environment. The cabinet 12 is shown equipped with two external lamps 16, green and red, that constantly indicate condition of the unit. Normal operation is indicated by green light turned on and red light turned off.

The oil mist generating system 10 shown in FIG. 1 includes a source of pressurized gas, an oil supply source and a mist generating head assembly 8. The pressurized gas is generally air or nitrogen. For the purpose of this description, it will be assumed that the pressurized gas is air supplied at an air supply inlet 18 which is connected to the source of pressurized air, such as instrument air, an air compressor or the like. From the air supply inlet 18, the pressurized inlet air initially passes through an air filter 20 where the inlet air is filtered and most of the moisture content removed. The clean dry air then flows through an air pressure regulator 24 for controlling the operating pressure of the mist generating head 8. The inlet air supply pressure is monitored by an air pressure switch 26 and is visually indicated on an air pressure gauge 28. The inlet air supply pressure is preferably from about 2 psi to about 100 psi. An air heater 30 is provided to heat inlet air, as needed. The air heater 30 typically includes a manifold which houses an air heater element. The air heater 30 is controlled by a thermostat 32 and a high temperature cut off switch 34 to maintain the temperature of the inlet air, preferably at about 100° F. This ensures a near constant flow rate of air and oil mist and stabilizes the oil-to-air ratio in the mist despite varying ambient temperatures. Heating the air also facilitates the misting of heavy oils at lower ambient temperatures. After the inlet air is filtered, regulated and heated, the inlet air is conducted to the oil mist generating head assembly 8.

In the system shown in FIG. 1, oil is supplied through an oil supply inlet 36. The oil flows through an oil filter 38 and the filtered oil flows into an oil reservoir 22. In an automatic refill configuration, oil flow into the reservoir 22 may be automatically controlled by an oil supply solenoid valve. As oil is consumed, a continuous oil level switch provides a control signal to the solenoid valve to control automatic reservoir refill. The reservoir 22 may be supplied with an oil heater, an oil temperature sensor and a high temperature oil cutoff switch. Oil temperature in the reservoir is preferably maintained at a temperature of about 100° F.

The mist generating head assembly 8 is connected to the air supply inlet 20 and the oil reservoir 22, and is the physical structure in which the air and oil are combined to form an oil mist. As described herein, the air stream generates the oil mist in the mist generating head assembly 8 and propels the mist through a mist distribution pipeline to the equipment to be lubricated. Although the mist generating system illustrated in FIG. 1 is used for generating an oil mist for lubricating machine parts, it is understood that the present invention may be used for the generation of any liquid mist.

Appropriate electrical circuitry is provided, and power supply wires enter the unit through dedicated openings in the cabinet 12. The electrical circuitry is not disclosed herein because it would add needless complexity and can be provided easily by one of ordinary skill in the art given the general purpose and desired operation of the system.

Figure 2:
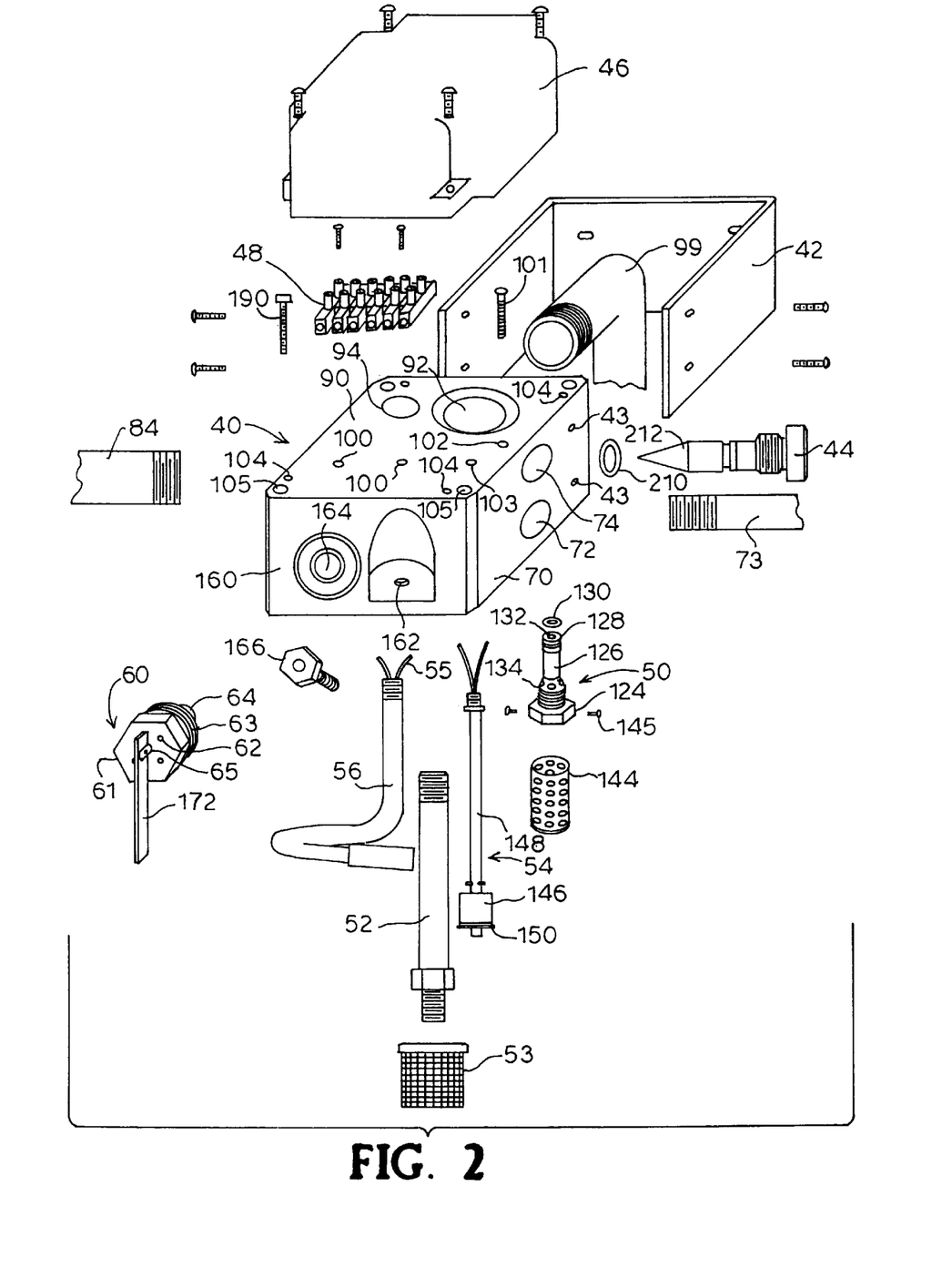
FIG. 2 is an exploded perspective view showing a mist generating head embodying features of the present invention.

An exploded view of an oil mist generating head embodying features of the present invention is shown in FIG. 2, and generally designated at 40. Outwardly, the mist generating head 40 is a rectangular solid and measures only about 4 inches by about 4 inches by about 2 inches. The mist generating head 40 is preferably metal, such as aluminum, and is machined from metal bar stock or die cast. Alternatively, the mist generating head 40 can be molded from a suitable plastic. Of course, the scope of the invention is not intended to be limited by the materials or fabrication methods listed here, but may be carried out using any material which allows the construction and operation of the device described herein. The mist generating head 40 is mounted to a stationary structure, such as the cabinet 12 shown in FIG. 1, by a bracket 42 which is fastened via bracket mounting holes 43 on each side of the mist generating head 40.

Figure 3:
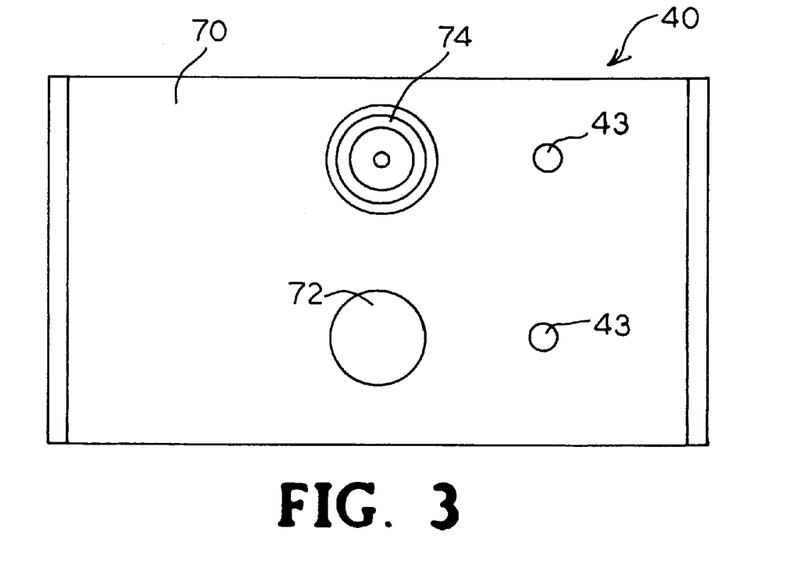
FIG. 3 is an elevational view of the rightward face of the oil mist head shown in FIG. 2.

The function of the mist generating head 40 is to combine oil and air to generate oil mist. The mist generating head 40 also provides for the components necessary to the mist generating system. The design allows a multitude of features in the small volume. Each face of the mist generating head 40 of the present invention comprises several openings that are designed to accommodate the various components, including an oil flow adjustment screw 44, an enclosure lid 46, a terminal strip 48, a mist generating nozzle 50, an oil pickup tube 52, an oil level switch 54, an oil heater 56, an oil reservoir filling port 162 and a pressure relief valve 60, all of which are described below. The right face 70 of the mist generating head 40, as seen in FIG. 3, is formed with an air inlet port 72 and an oil flow adjustment port 74. The rearward portion of the right face 70 includes the bracket mounting, holes 43. The air inlet port 72 is internally threaded for receiving a conventional inlet air supply connection 73 (FIG. 2). The connection 73 is threaded snugly inside the air inlet port 48 in sealing relation. The oil flow adjustment port 74 is internally threaded for receiving the oil flow adjustment screw 44 shown in FIG. 2.

Figure 4:
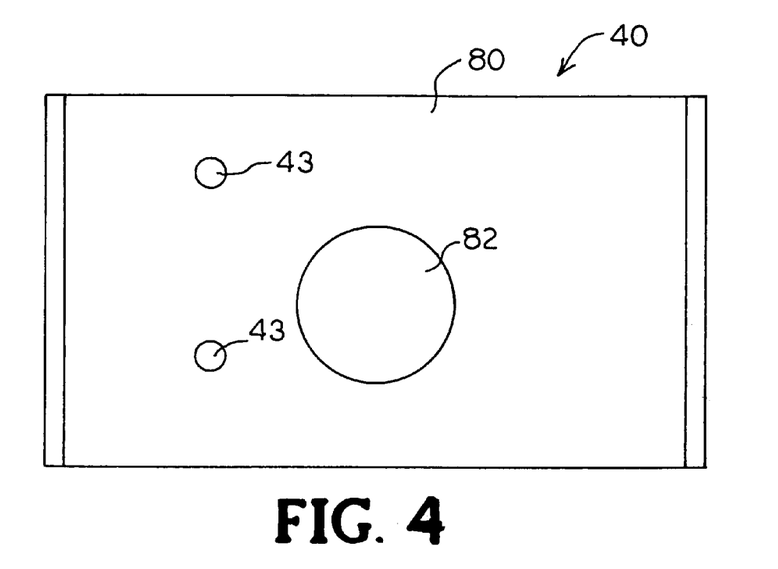
FIG. 4 is an elevational view of the leftward face of the oil mist head shown in FIG. 2.

The left face 80 of the mist generating head 40 has an oil mist outlet port 82 (FIG. 4). The oil mist outlet port 82 is internally threaded for connection to a conduit 84 (FIG. 2) leading to the oil mist distribution system beyond the end of the conduit 84. The rearward portion of the left face 80 also has bracket mounting holes 43.

Figure 6:
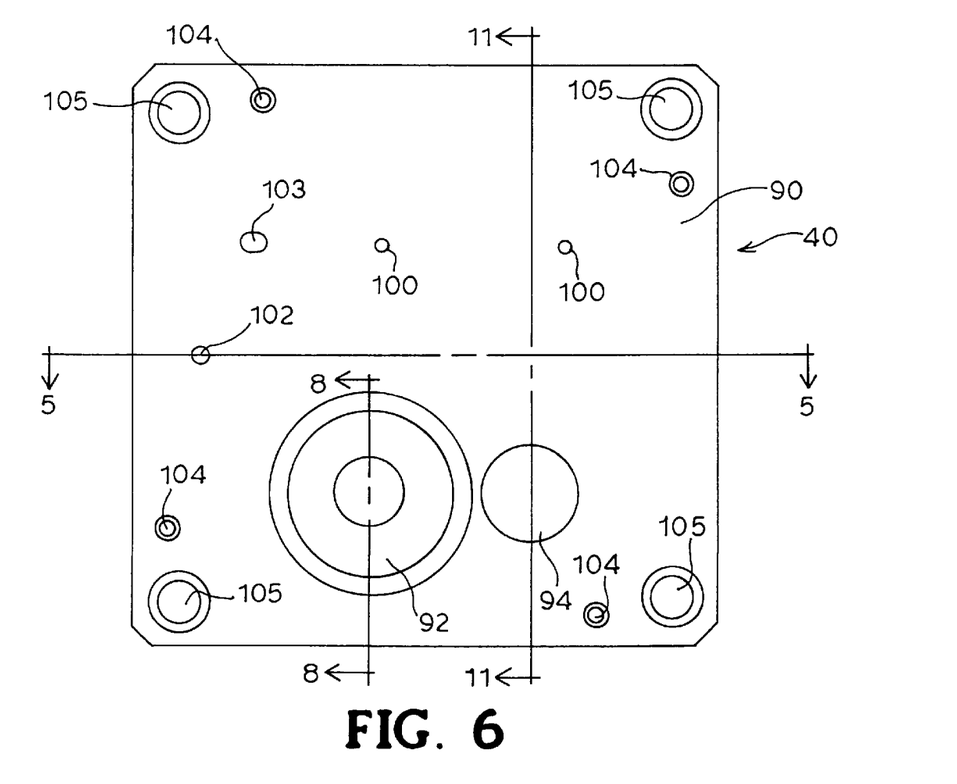
FIG. 6 is a plan view of the top face of the oil mist head shown in FIG. 2.
Figure 7:
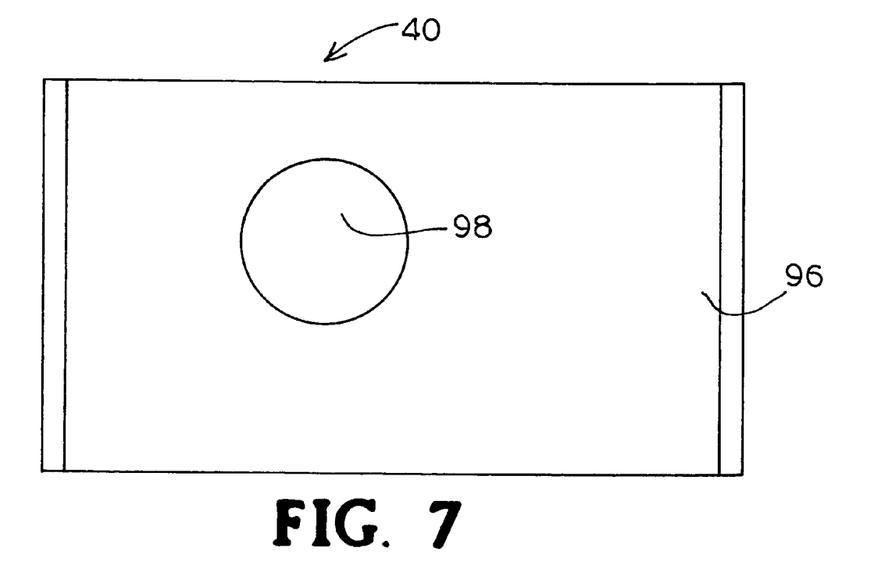
FIG. 7 is an elevational view of the rear face of the oil mist head shown in FIG. 2.
Figure 8:
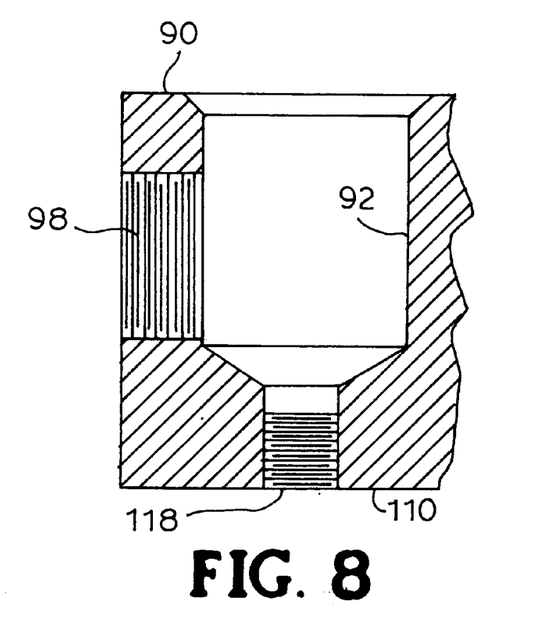
FIG. 8 is a partial sectional view taken on line 8—8 of FIG. 6.

FIG. 6 shows the top face 90 of the mist generating head 40. Two openings 92, 94 are shown in the rear portion of the top face 90. The larger opening 92 constitutes a wiring gallery. An electrical conduit port 98 (FIG. 7) in the rear face 96 of the mist generating head 40 extends inwardly to intercept the upper portion of the wiring gallery 92 (FIG. 8). Power supply wires enter the mist generating head 40 through the electrical conduit port 98 which is internally threaded to accept a suitable conduit connector 99 (FIG. 2). The top face 90 (FIGS. 2 and 6) of the mist generating head 40 also has holes 100 for fastening the terminal strip 48 for making any electrical connections associated with the oil mist lubricating system 10, such as power supply, controls and instrumentation. A ground screw hole 103 is also provided. A locking screw 101 (FIG. 2) in a threaded hole 102 in the top face 60 secures the oil flow adjustment screw 44 preventing the operator from ever completely shutting off the oil supply, discourages tampering with the oil flow rate and movement of the screw 44 due to vibration. At each of the corners of the top face 60 of the mist generating head 40 are two holes 104, 105. One set of holes 104 threadably receive screws for fastening the box-shaped molded enclosure lid 46 to the mist generating head 40 for sealingly enclosing the top face 60 (FIG. 2). The other holes 105 are countersunk and extend through the mist generating head 40 and accept bolts for securing the mist head 40 to a specially designed oil reservoir connection, as will be described below.

The bottom face 110 of the mist generating head 40 (FIG. 9), besides mounting holes 105, has six openings. The six openings include a mist generating nozzle port 112, an oil intake port 114, an oil mist outlet gallery 116, an oil level switch port 118, an oil heater port 120 and an oil reservoir refill port 122. Preferably, the oil intake port 114, oil level switch port 118 and oil heater port 120 are in close proximity to allow the oil pickup tube 52, oil level switch 54 and oil heater 56 (FIG. 2) to coexist within the smallest possible space. This feature of the present invention enables the mist generating head 40 to be used with the smallest possible oil reservoir.

The mist generating nozzle port 112 is threaded for receiving the mist generating nozzle 50. As shown in FIG. 2, the nozzle resembles a large screw having an open-ended hexagonal head 124 which permits the nozzle 50 to be turned with a wrench. The body of the nozzle 50 tapers to a throat portion 126. The diameter of the throat 126 is enlarged at its end 128 and has a circumferential groove which holds an o-ring 130. The throat 126 of the nozzle 50 has an axial oil inlet opening 132 which extends through the throat 126 and opens at the head 124. Air inlet openings 134 angle inwardly from the tapered throat 126 and also open at the head adjacent the oil inlet opening 132. The nozzle shown in FIG. 2 is designed to generate mist at rates up to about 65 cfm. The mist generating nozzle 50 is secured in the internally threaded portion of the oil mist nozzle port 112 (FIG. 5) and extends through the port and into a passage 142 extending inwardly from the mist nozzle port 112. The enlarged end 128 of the nozzle fits closely in a reduced intermediate portion of the nozzle passage 142 and is sealed by the o-ring 130.

Figure 5:
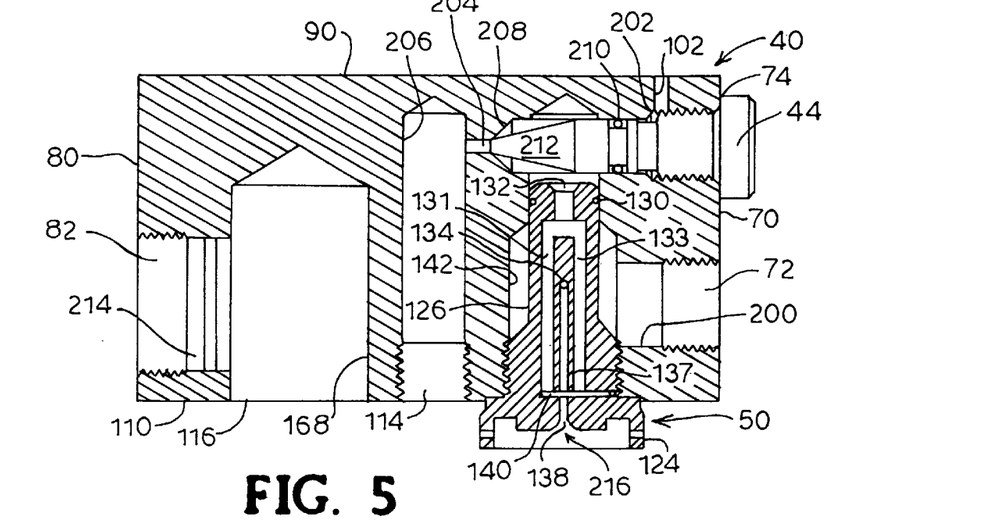
FIG. 5 is a sectional view taken on line 5—5 of FIG. 6.

A low volume nozzle is shown in cross-section in FIG. 5. The oil inlet 132 divides internally of the nozzle throat 126 into two longitudinal passages 131, 133. An air inlet cross hole 134 is drilled in the throat 126 of the nozzle 50. A central axial hole 138 is drilled from the head 124 and opens into the air inlet cross hole 134. A second cross hole 140 is drilled partially through the nozzle 50 at the base of the head 124 and plugged. The second radial cross hole 140 intersects the longitudinal oil passages 131, 133 and air passage 138. The flow rating of the nozzle is determined by the diameter and the length of the air passage 138. In FIG. 5, an insert 137 is shown in the bottom of the air passage which is drilled to a suitable diameter for the air flow rate desired. Maximum flow is achieved by simply removing the insert 137.

The nozzle design shown in FIG. 5 results in a nozzle capable of producing mist at a rate as low as about 0.1 cfm, and yet is the same overall size and shape as the high flow rate nozzles. This feature is not available with the nozzle design shown in FIG. 2 because the angled holes would have to be so small for a low volume nozzle that they could easily clog and would be difficult to manufacture. The single air inlet hole design, as opposed to the several holes passing through the throat 126 as shown in FIG. 2, allows the air inlet diameter to be larger which enables low volume nozzles. Thus, the mist generating head 40 of the present invention has interchangeable nozzles having a range of flow rates of from about 0.1 cfm to about 65 cfm. Therefore, the mist generating head 40 may be used on small or large oil mist generators.

A baffle 144 (FIG. 2) comprising a cylindrical piece of perforated metal is fastened in a counter bore inside the head 124 of the nozzle 50 by means of screws 145 and extends from the bottom of the nozzle.

The oil intake port 114 (FIG. 9) threadably receives an oil pickup tube 52 (FIG. 2) which extends from the bottom face 110 of the mist generating head 40. As shown in FIG. 2, the inlet end of the oil pickup tube 52 is secured in a strainer 53 comprising a fine wire mesh. The strainer 53 filters the oil as it is drawn into the pickup tube 52 to prevent contaminants from clogging the mist generating head 40 passages and nozzle 50.

As seen in FIG. 8, the lower portion of the wiring gallery 92 in the top face 90 of the mist generating head 40 narrows to form the threaded oil level switch port 118 in the bottom, face 110 for receiving an oil level switch or float valve. Oil level switches are known in the art, including radio frequency level switches, conductivity level switches, ultrasonic switches, and the like. Any such switch fitting the port 118 is suitable for use in the present invention. An example of an oil level float switch 54 for threading into the oil level switch port 118 is shown in FIG. 2. The oil level float switch 54 comprises a float 146 sliding on a shaft 148. A washer 150 is secured to the bottom of the float 146. The diameter of the washer 150 is slightly larger than the float 146 so that the washer 150 will engage the inside of the wall of the oil reservoir allowing the float 146 to move freely along the shaft 148, especially in smaller reservoirs. The oil level float switch 54 continuously measures and controls the oil level. When the oil level in the reservoir is diminished, the float switch 54 activates the oil supply solenoid.

Figure 9:
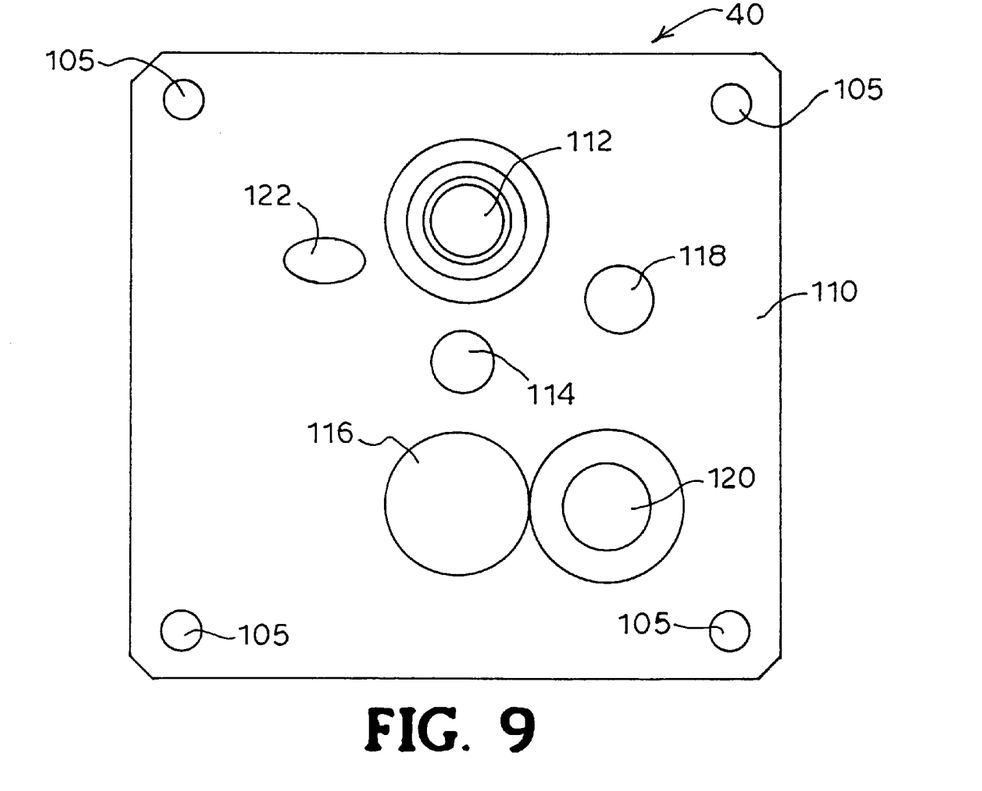
FIG. 9 is an elevational view of the bottom face of the oil mist head shown in FIG. 2.
Figure 11:
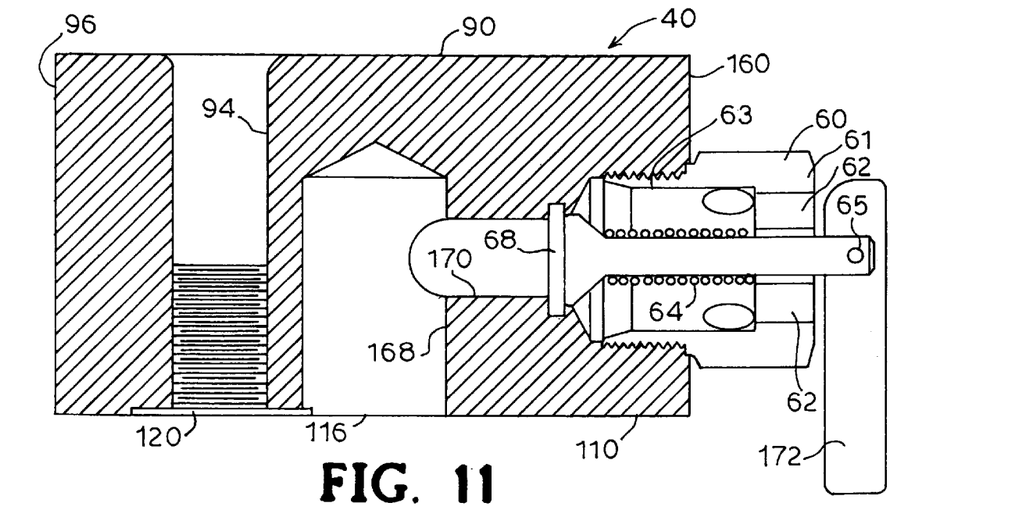
FIG. 11 is a sectional view taken on the line 11—11 of FIG. 6.

As seen in FIG. 11, the small opening 94 formed in the top face 90 of the mist generating head 40 extends through the head to form the oil heater port 120 in the bottom face 80 (FIG. 9). The oil heater port 120 threadably receives the end of the oil heater 56 (FIG. 2). The heater 56 can be secured using a compression fitting which is tightened on the heater tubing to secure the oil heater in place. The oil heater wires 55 extend through the opening 94 in the top face 90 of the mist generating head 40 for connection to the terminal strip 48. Preferably, the oil heater 56 is an immersion heater designed to heat all of the oil in the reservoir. As is conventional, the oil heater 56 is regulated by thermostatic control operatively connected to the heating element and adjusted to maintain the temperature of oil within the reservoir at about 100° F. Due to the limited size of the mist generating head 40, the thermostat is preferably an integral part of the oil heater 56. A suitable oil heater is available from the Edwin L. Wiegand Division of Emerson Electric Company, Pittsburgh, Pa., U.S.A., which also includes a melt-in link which acts as a fuse breaking the circuit if the oil reaches an excessive temperature.

Figure 10:
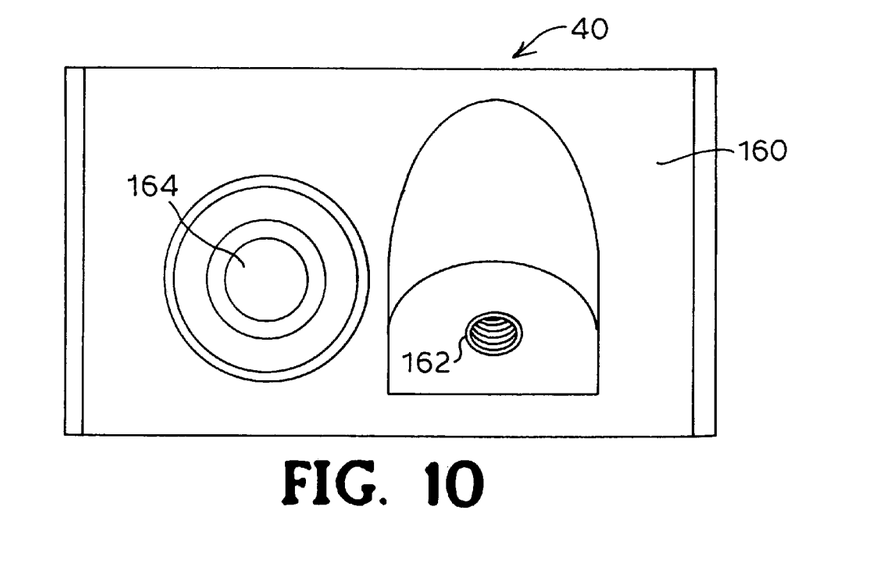
FIG. 10 is an elevational view of the front face of the oil mist head shown in FIG. 2.

The front face 160 (FIG. 10) of the mist generating head 40 includes an oil reservoir filling port 162 and a pressure relief port 164. The oil reservoir filling port 162 is the entry point for adding oil to the oil reservoir and is in fluid communication with the oil reservoir refill port 122. The oil reservoir filling port 162 is designed to accommodate a loader fitting 166 (FIG. 2). For manual filling using a funnel, the loader fitting 166 is simply a threaded plug. For automatic filling during operation, the loader fitting 166 is a check valve coupled to a pump outlet for refilling the oil reservoir under pressure.

The pressure relief port 164 is adapted to threadably receive the pressure relief valve 60 (FIG. 2). The pressure relief valve 60 resembles a threaded plug having a hex-shaped head 61. Preferably, the pressure relief port 164 has a non-standard thread to prevent the user from plugging the pressure relief port 164 with a standard-thread plug. This ensures that the pressure relief valve 60, which is conventionally part of the reservoir, is an integral part of the mist generating head 40 of the present invention. The pressure relief valve head 61 has four holes 62 opening into the threaded portion 63 of the valve body. As best seen in FIG. 11, a plunger 64 is slidably received in a central hole through the head 61. A lever 172 is pivotally mounted to the outer end of the plunger 64 by a pin 65. A spring 66 surrounds the plunger 64 and is held in compression against the inner face of the head 61 and the enlarged inner end of the plunger 64. The spring 66 forces the inner end of the plunger 64 against the pressure relief port 164. Gasket material 68 at the end of the plunger seals the engagement. As shown in FIG. 11, a passage 168 extending upwardly from the mist gallery outlet port 116 is intersected by a passage 170 extending inwardly from the pressure relief port 164 in the front face 110 of the mist generating head 40. Should too great a pressure build up in the mist generating system, the plunger 64 will be forced off the pressure relief port 164 against the force of the spring 66 permitting oil mist to escape through the pressure relief passage 170 and out the holes 62. Preferably, the valve is set to release at about 5 psig to about 10 psig. The accessibility of the relief valve 60 permits its secondary use as a mist sampling valve. When the lever 172 is pivoted, the plunger 64 is lifted from its seal and the valve 60 opened to confirm that there is mist coming from the unit and the system is functioning.

Figure 12:
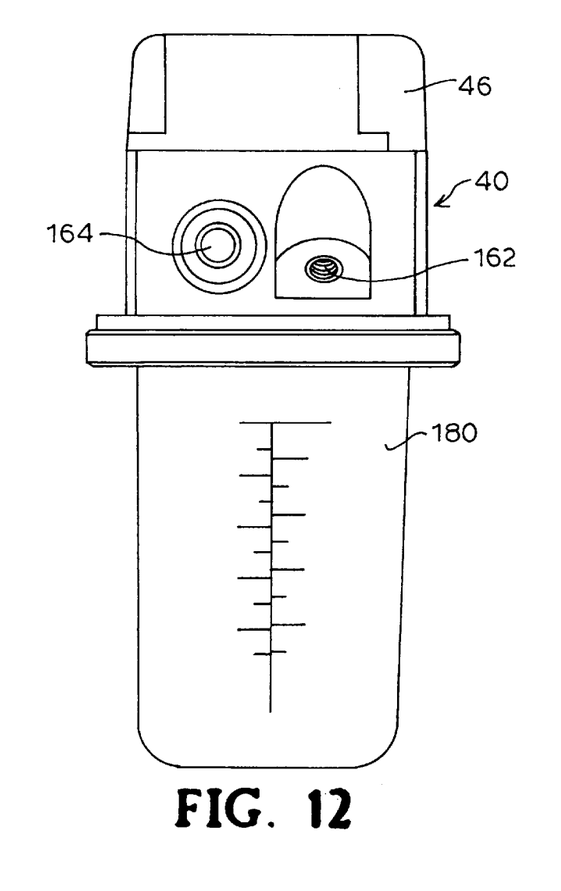
FIG. 12 is a side elevational view of a liquid reservoir secured to the mist head, including the lid.
Figure 13:
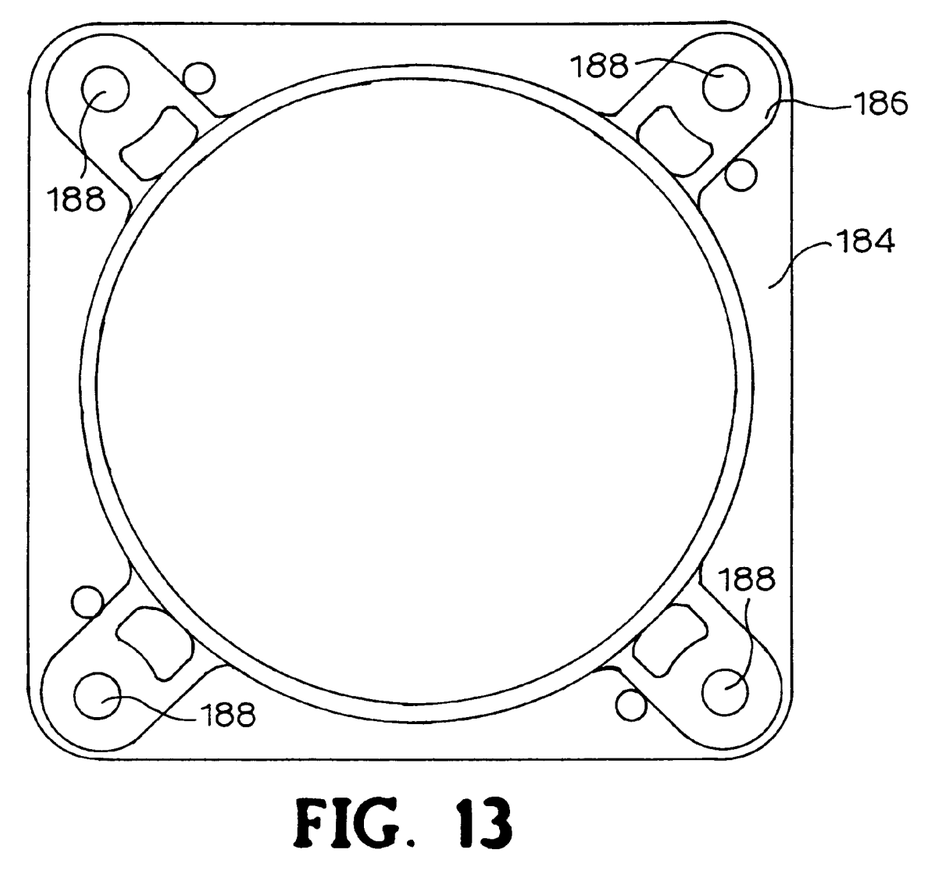
FIG. 13 is a top plan view of the liquid reservoir shown in FIG. 12.
Figure 14:
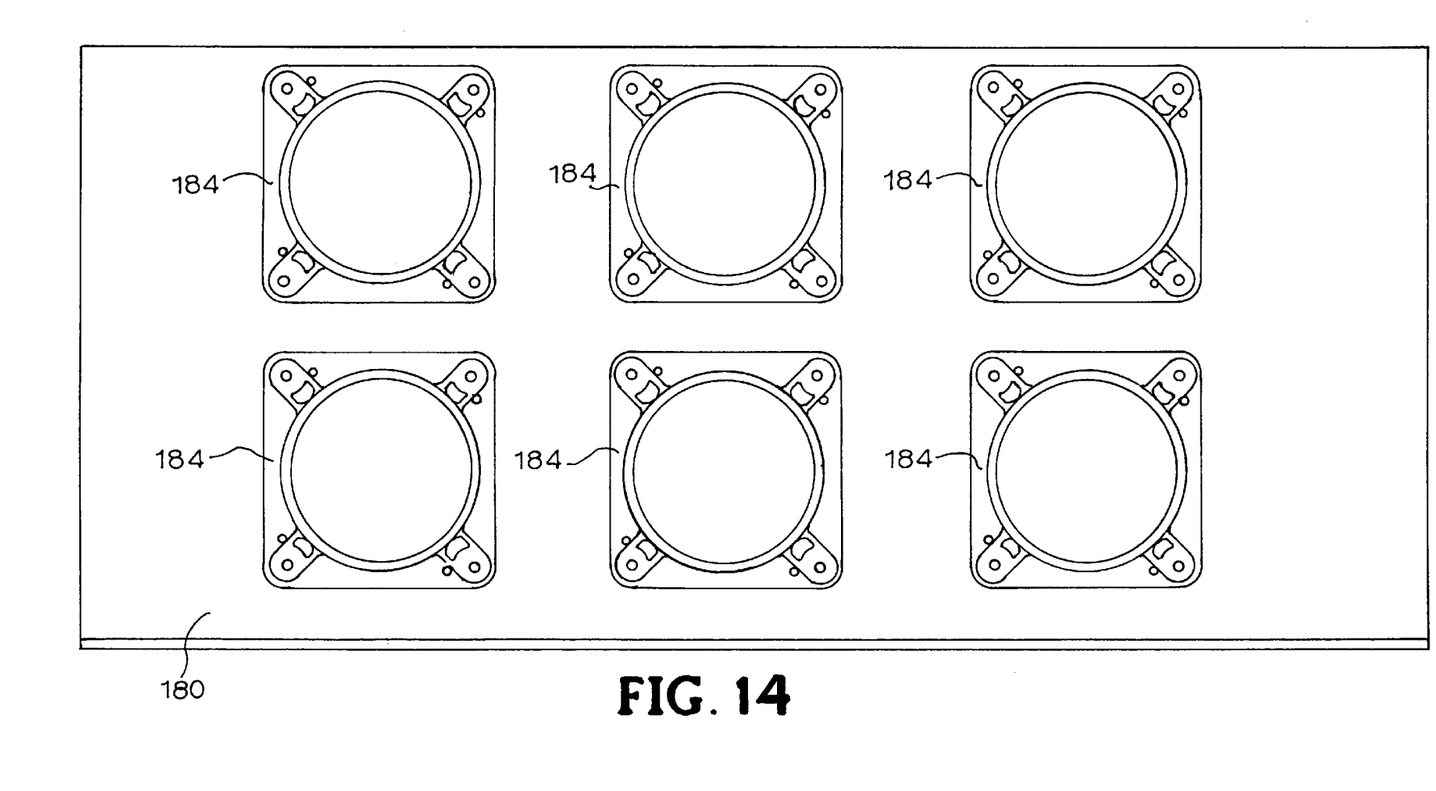
FIG. 14 is a top plan view of a five gallon liquid reservoir.

Different size oil reservoirs 180 (FIG. 12) are used with the mist generating head 40 of the present invention, ranging from as small as one pint to several gallons. FIG. 12 shows the mist generating head 40 secured to a one pint reservoir 180 with the lid 46 in place. The smaller reservoirs are preferably molded, translucent plastic, such as Grilamide TR90, a transparent formulation of nylon 12 available from EMS-American Grilon, Inc., of Sumter, S.C., U.S.A. Larger reservoirs can be made from plastic, cast aluminum, steel, stainless steel, and the like. Regardless of its size, each reservoir 180 has an identical mist head connection port 184 (FIG. 13) for attaching the reservoir to the bottom face 110 of the mist generating head 40. The mist connection port 184 has four threaded holes 188 matching the pattern of the bolt holes 105 in the mist generating head 40. A groove is cut or machined into the reservoir around the connection port 184 for receiving a gasket 186 ensuring an airtight connection between the bottom face 110 of the mist generating head 40 and reservoir connection port 184. The mist generating head 40 is positioned over the connection port 184 with the bolt holes 105 aligned with the reservoir holes 188. The mist generating head 40 is secured to the top of the reservoir 180 by suitable fasteners, such as threaded bolts 190, extending through the holes 105 and into the reservoir holes 188. Since the mounting geometry is identical, the mist generating head 40 of the present invention is used on any size reservoir. When different capacity reservoirs are desired, the connecting bolts 190 are removed and the new reservoir installed. If needed, the pickup tube and float switch may be changed to the appropriate length to accommodate reservoir depth. Larger reservoirs include multiple head connection ports 184. For example, a five gallon reservoir 180 could have provision for up to six heads (FIG. 14).

FIG. 5 shows the oil mist generating passage with the mist generating nozzle 50 and oil flow adjustment screw 44 in place. Preferably, air flow enters one side of the head and exits the opposite side since oil mist lubrication systems have traditionally employed this flow-through configuration. Therefore, the user would not have to replumb an existing system to retrofit the mist generating head 40 of the present invention. Also, this approach simplifies head design and makes possible the use of a small volume mist generating head as contemplated by the present invention.

As seen in FIG. 5, an air inlet passage 200 is formed inwardly from the air inlet port 72. The air inlet passage 200 opens into the vertical nozzle passage 142 adjacent the oil mist generating nozzle 50. The upper portion of the nozzle passage 142 has a reduced diameter and communicates with an oil adjustment passage 202 extending inwardly from the oil adjustment port 74. A reduced diameter portion 204 of the oil adjustment passage 202 continues inwardly from the passage 142 and constitutes an oil inlet 204. The oil inlet 204 opens into a vertical oil intake passage 206 extending upwardly into the mist generating head 40 from the oil intake port 114. The nozzle passage 142 is thereby in fluid communication with the oil contained within the reservoir 180 through the described passages. The oil adjustment screw 44 is provided with an o-ring 210 for sealing against the oil adjustment passage 202. The feed rate at which oil is introduced into the air flow in the nozzle 50, and the resulting mist density, is adjusted by controlling the relationship of the tip 212 of the oil adjustment screw 44 with the opening of the oil inlet 204. Increased flow is accomplished by counterclockwise rotation of the screw 44 opening the area between the tip 212 and oil inlet 204 to allow more oil to flow into the passage 142. Clockwise rotation of the screw 44 closes off the oil inlet 204 decreasing oil flow. The oil adjustment port 74 is on the right face which is easily accessible to the user and affords a convenient and ready control of the oil mist by simply turning the screw 44. Preferably, the oil flow adjustment screw 44 engages the set screw 101 in the hole 102 in the top face 90 of the mist generating head 40 before the tip 212 completely seals the oil inlet 204. Alternatively, the oil flow adjustment screw 44 is manufactured so the screw head engages the right face 70 of the mist generating head 40 before the inlet 204 is closed. This feature prevents the user from ever completely shutting off the oil supply. As described above, the oil adjustment screw 44 is also retained in place by the set screw 101.

An oil mist outlet passage 214 is formed inwardly from the oil mist outlet port 82 and connecting the oil mist outlet port 82 with the vertical oil mist gallery passage 168. The oil mist gallery passage 168 extending from the mist gallery outlet 116 in the bottom face 80 of the mist generating head 40 provides a common connection to the mist outlet port 82 and the pressure relief port 164.

The hydraulic circuitry for oil mist generation is thus shown and has been described. The operation of the oil mist system is understood by those skilled in the art. Oil mist generation is initiated when the air supply is activated. This will cause pressurized air to enter through the air inlet port 72, pass through the air inlet passage 200 and into the nozzle passage 142. The pressurized air which enters the nozzle passage 142 passes through the air inlet hole, or holes, 134 of the nozzle 50, out the head 124 and into the air space above the oil in the reservoir. In the large volume nozzle (FIG. 2), the air passes through the air inlet holes 134 in the tapered throat portion 126 of the nozzle 50 and out the head 124. In the low volume nozzle (FIG. 5), air enters the air inlet cross hole 134 in the throat 126 of the nozzle 50 and passes down the central hole 138 and out the head 124. As the air issues from the expanded portion of the nozzle 50, a low pressure region 216 is created, as will be appreciated by those skilled in the art. The reduced pressure region 216 has the effect of drawing oil up the pickup tube 52 and the oil intake passage 206, through the oil inlet passage 204 and into the nozzle 50. Oil and high velocity air mix breaking the oil into very minute particles to form an oil mist. The mist exits the nozzle 50 and enters the baffle 144. The large mist particles strike the baffle 144 end plate and drop back into the reservoir. The smaller mist particles, which are able to change direction, flow laterally through the baffle 144 holes and disperse into the air space above the oil in the reservoir 180. The oil mist gravitates through the space above the oil in the reservoir to the oil mist outlet gallery 116 and to the oil mist outlet port 82 for distribution to points of application.

The multiple head connection ports 184 (FIG. 14) on the large reservoir enables a large variety of stand-by capacity options. For example, the ability to locate two generating heads and two instrument heads on the same reservoir is an economic configuration for an emergency stand-by operation eliminating the need for a reserve oil supply and head. This gives the operator a redundant system in case something goes wrong with the primary system. Multiple head connection ports also allow customization. For example, the user has the flexibility to place a mist generating head 40 wherever he wants, or use as many six heads working off the same oil supply. Unused head connection ports 124 are sealed with a plate.

Multiple mist head connection ports 184 also permit more than one operating mist generating head to be located in communication with the same oil supply. Each head could have its air supply separately controlled. Assuming for example that a first head had a mist generating nozzle having a 4 cfm output and a second head had a 7 cfm output nozzle, different amounts of mist could be delivered to the equipment. If only the first head is operating the machinery needing lubrication would receive 4 cfm of oil mist, the amount of oil needed for nominal running conditions. If only the second head is operating the machinery would receive 7 cfm of oil mist, sufficient oil for the special needs of full load conditions. If both heads are operating, the machinery would receive a total of 11 cfm of oil mist for emergency or quick start up conditions. Alternatively, a mist generating head 40 can be made having two mist generating passages.

This multi-port feature also provides locations for "special purpose" heads. One such special purpose head could have a large diameter oil mist outlet port to serve as a high mist output head. The high mist outlet head is necessary where the mist flow rate exceeds about 4 to about 5 cfm, as in the example above. At mist generation rates above this level the mist velocity increases to a point where the mist particles begin to collide and drop out, or impinge on the sides of the passages. To solve this problem, the oil mist outlet port of the mist generating head, or heads, are plugged and the high mist output head installed on the reservoir to serve as the mist outlet. Alternatively, a large mist outlet port could be provided in the reservoir. Another special purpose head embodied within the present invention is an automatic refill head having an oil level switch and reservoir filling port. Instrument heads carrying gauges, sensors and the like for monitoring the unit's operation; heating heads for heating the oil; oil supply inlet heads with filters and other special heads can also be designed for unique customer needs.

The operating conditions of the system may be monitored as is customary. As noted above, general present condition information is provided using green or red lights, an alarm condition occurring when the red light is on. Other basic monitoring information includes oil level and mist pressure with site and pressure gauges. Enhanced monitoring levels could also include oil and air temperatures. More sophisticated systems may consist of monitoring the status of all operating variables with history and mechanical redundancy. The monitoring system may further provide alarms warning of urgent or out of control trends and even signals for turning off machinery.

Along with monitoring, system control may also be provided. For example, as noted above, air and oil temperature are usually maintained within preset limits. Other operating variables which may be controlled include the oil level, mist pressure, mist density, regulated air pressure, mist temperature, inlet oil pressure and inlet oil totalizer. Built-in solid state programming control units for oil mist control lubricating systems are available. Other methods of control include programmable logic microcontrollers, configurable data acquisition and control systems, smart I/O devices or universal electronic controllers.

The previously described embodiments of the present invention have many advantages, including a general purpose mist generating head of unusually compact and efficient construction. The general purpose mist head is a complete mist generating unit having all of the essential functions for mist generation in a single unit. The head design also incorporates a multitude of additional features in a geometrically optimal volume. Because the mist generating head is adapted to receive specially designed low and high volume nozzles, the mist generating head is operative with any size mist generating system to serve any or all of the functions necessary to generate oil mist. Further, the mist head function may be varied to an extent not heretofore known in the art.

A significant advantage of the mist generating head of the present invention is the interchangeability of the mist heads with the same or different size units. This is accomplished by utilizing the same sealing arrangement of the head to the reservoir. The user can change or upgrade the system in terms of tank volume, materials, features and instrumentation. Since the large systems use the same head and other parts common to the smaller systems, the present invention provides an economical, upgradeable mist generation system versatile enough to accommodate the largest range of customer needs by using the smallest number of components. By avoiding purchasing a new system and related parts, the cost savings to the customer is enormous.

Because larger volume reservoirs have several identical head connecting ports for installing multiple mist generating heads, the user has a tremendous amount of flexibility and options in locating the heads, whether for convenience to fit with plumbing and electrical connection restraints or for redundancy as required for emergency use. This is especially true since each head may serve a specific function.

The oil mist lubricating system incorporating the features of the present invention is more serviceable than older systems. By having all of the oil mist components in the head, and since the head is rigidly mounted to the outlet piping, it is an advantage to have the head remain stationary and the tank easily removed as a separate part. If there is a failure in a multi-port unit, the user simply removes the faulty head by extracting the mounting bolts, disconnecting pipe and electrical connections and installing a spare head and reconnecting the system. Equipment downtime is minimized as the faulty head can then be serviced at the user's convenience. Since the high volume systems use the same head and other parts common to the smaller systems, the user will be able to service and maintain the present system with a small inventory of spare parts.

The mist head of the present invention is designed so that it can be manufactured in a variety of ways. This feature allows for either low volume production from bar stock in a machine shop environment, or manufacture as a low cost, high volume die casting. This adaptable approach enables the manufacturer to meet the variety of needs of the user, even if the user requires special materials that will not react with the lubricant or be adversely affected by the environment. Again, because the head is operative with a broad range of mist generators, the need to manufacture a large product line that contains many unique pieces of mist producing equipment is avoided. The design is simple and fewer parts are necessary to assemble by less skilled labor. Producing a smaller number of components and a larger number of products reduces overhead giving the customer the benefit of quantity prices and effecting inventory and restocking problems. Although the present invention has been described in considerable detail in connection with preferred embodiments thereof, other versions are possible. It will be understood, of course, that we do not intend to limit the invention to the embodiments since modifications may be made by those skilled in the art, particularly in light of the foregoing teachings. For example, it will be understood by those skilled in the art that reservoir sizes and further specialized heads are all possible variations. On the contrary, we intend to cover all alternatives, modifications and equivalents as may be included within the spirit and scope of the invention as defined by the appended claims. It is, therefore, contemplated by the appended claims to cover any such modifications as incorporate those features which constitute the essential features of these improvements within the true spirit and the scope of the invention.

We claim:

1. An apparatus for generating a mist for use in a centralized, pressurized gas-driven mist generating system including a liquid reservoir, the mist generating apparatus comprising:
   a mist generating head adapted for mounting on the liquid reservoir, the mist generating head having
   (a) a mist generating passage,
   (b) a pressurized gas inlet passage, the pressurized gas inlet passage connecting with the mist generating passage, and
   (c) a liquid inlet passage, the liquid inlet passage connecting with the mist generating passage;
   the mist generating head further comprising means for generating mist disposed in the mist generating passage; and
   means for relieving excess gas pressure disposed in the mist generating passage.

2. A mist generating apparatus as recited in claim 1, wherein the excess gas pressure relief means comprises a pressure relief valve, the pressure relief valve adapted to open if the gas pressure in the mist generating system reaches a predetermined level.

3. A mist generating apparatus as recited in claim 1, wherein the mist generating head further comprises means for controlling the liquid flow rate for adjusting the ratio of liquid-to-gas in the mist.

4. A mist generating apparatus as recited in claim 3, wherein the liquid flow rate controlling means comprises an adjusting member disposed in the liquid inlet passage, a portion of the adjusting member extending externally of the frame member to a position accessible for adjustive manipulation by an operator.

5. A mist generating apparatus as recited in claim 4, wherein the adjusting member comprises a threaded needle valve.

6. A mist generating apparatus as recited in claim 1, wherein the mist generating means generates a mist at a rate of about 0.1 cfm to about 65 cfm.

7. A mist generating apparatus as recited in claim 1, wherein the mist generating means comprises a mist generating nozzle having a gas and liquid admixing chamber for introducing liquid into the flowing pressurized gas whereby the liquid is broken down into discrete droplets by the pressurized gas and minute particles of the liquid are thus atomized and dispersed in the gas.

8. A mist generating apparatus as recited in claim 7, wherein the mist generating nozzle comprises a gas-operated venturi.

9. A mist generating apparatus as recited in claim 8, wherein the mist generating nozzle generates a mist at a rate less than about 2.3 cfm.

10. A mist generating apparatus as recited in claim 1, further comprising a liquid supply tube received in the liquid inlet passage of the mist generating head.

11. A mist generating apparatus as recited in claim 1, further comprising a liquid heater, the mist generating head having a bore for receiving the liquid heater.

12. A mist generating apparatus as recited in claim 1, further comprising a liquid level detector, the mist generating head having a bore for receiving the liquid level detector.

13. A mist generating apparatus as recited in claim 1, further comprising a liquid reservoir sealingly secured against the mist generating head for containing the liquid supply.

14. A mist generating apparatus as recited in claim 13, the mist generating head having a reservoir filling passage, one end of the reservoir filling passage opening into the reservoir and the other end opening externally of the mist generating head.

15. A mist generating apparatus as recited in claim 13, wherein the reservoir has a plurality of mounting ports for the mist generating head, and a plurality of mist generating heads connected to the mounting ports.

16. An apparatus for generating a mist for use in a centralized, pressurized gas-driven mist generating system, the mist generating apparatus comprising:
   a frame member having
   (a) a mist generating passage,
   (b) a pressurized gas inlet passage, the pressurized gas inlet passage connecting with the mist generating passage, and
   (c) a liquid inlet passage, the liquid inlet passage connecting with the mist generating passage;
   (d) means for generating mist disposed in the mist generating passage;
   (e) means for relieving excess gas pressure disposed in the mist generating passage; and
   (f) an electrical conduit passing through the frame member for receiving and conveying power supply wires.

17. An apparatus for generating a mist for use in a centralized, pressurized gas-driven mist generating system, the mist generating apparatus comprising:
   a frame member having
   (a) a mist generating passage,
   (b) a pressurized gas inlet passage, the pressurized gas inlet passage connecting with the mist generating passage, and
   (c) a liquid inlet passage, the liquid inlet passage connecting with the mist generating passage;
   (d) means for generating mist disposed in the mist generating passage;
   (e) means for relieving excess gas pressure disposed in the mist generating passage; and
   an electrical terminal strip fastened to the frame member for electrical connection requirements of the mist generating system.

18. An apparatus for generating a mist for use in a centralized, pressurized gas-driven mist generating system, the mist generating apparatus comprising:
   a first frame member for generating mist, the first frame member comprising
   (a) a mist generating passage,
   (b) a pressurized gas inlet passage, the pressurized gas inlet passage connecting with the mist generating passage, and
   (c) a liquid inlet passage, the liquid inlet passage connecting with the mist generating passage;
   (d) means for generating mist disposed in the mist generating passage; and
   (e) means for relieving excess gas pressure disposed in the mist generating passage;
   a second frame member having a mist outlet passage sized to accommodate the generated mist; and a reservoir for containing the liquid supply, the reservoir having a plurality of mounting ports for sealingly securing the first and second frame members to the reservoir.

19. An apparatus for generating a mist for use in a centralized, pressurized gas-driven mist generating system including a liquid reservoir, the mist generating apparatus comprising;
- a mist generating head adapted for mounting on the liquid reservoir, the mist generating head having
  - (a) a mist generating passage,
  - (b) a pressurized gas inlet passage, the pressurized gas inlet passage connecting with the mist generating passage, and
  - (c) a liquid inlet passage, the liquid inlet passage connecting with the mist generating passage;
- a mist generating nozzle disposed in the mist generating passage, the nozzle having a gas and liquid admixing chamber for introducing liquid into the flowing pressurized gas whereby the liquid is broken down into discrete droplets by the pressurized gas and minute particles of the liquid are thus atomized and dispersed in the gas; and
- a pressure relief valve disposed in the mist generating passage, the pressure relief valve adapted to open if the gas pressure in the mist generating system reaches a predetermined level.

20. A mist generating apparatus as recited in claim 19, wherein the mist generating passage is adapted to receive mist generating nozzles having mist flow rates ranging from about 0.1 cfm to about 65 cfm.

21. A mist generating apparatus as recited in claim 19, further comprising an adjusting member disposed in the liquid inlet passage for controlling the liquid flow rate for adjusting the ratio of liquid-to-gas in the mist, a portion of the adjusting member extending externally of the mist generating head to a position accessible for adjustive manipulation by an operator.

22. A mist generating apparatus as recited in claim 19, further comprising a liquid heater, the mist generating head having a bore for receiving the liquid heater.

23. A mist generating apparatus as recited in claim 19, further comprising a liquid level detector, the mist generating head having a bore for receiving the liquid level detector.

24. A mist generating apparatus for a centralized, pressurized gas-driven mist generating system, the mist generating apparatus comprising:
- a block comprising,
  - a gas and liquid mixing passage,
  - a pressurized gas inlet passage intersecting the mixing passage,
  - a liquid supply passage,
  - a liquid inlet passage interconnecting the liquid supply passage and the mixing passage, the liquid inlet passage conducting liquid from the liquid supply passage to the mixing passage, and
  - a mist outlet passage extending through the exterior of the block;
- means for generating mist received in the mixing passage; and
- the block having first and second bores for receiving a liquid heater and a liquid level detector for detecting the level of the liquid.

25. A mist generating apparatus as recited in claim 24, further comprising a reservoir sealingly secured against the block for containing the liquid supply, and a liquid supply tube received in the liquid supply passage of the block, the liquid supply tube, liquid heater and liquid level detector extending into the reservoir.

26. A mist generating apparatus as recited in claim 24, the block further comprising first and second opposed side faces and a bottom face, the first side face having an opening to the pressurized gas inlet passage, the second side face having an opening to the mist outlet passage, and the bottom face having openings to the mixing passage and the liquid supply passage, and wherein the first and second bores for receiving the liquid heater and the liquid level detector are provided in the bottom face.

27. A mist generating apparatus as recited in claim 26, the block further comprising a front face, the front face having a bore opening through to the bottom face.

28. A mist generating apparatus as recited in claim 27, wherein the front face has an opening extending inwardly to the mist outlet passage for receiving a pressure relief valve.

29. A mist generating apparatus as recited in claim 26, wherein the first side face has an opening extending inwardly through the mixing passage and to the liquid inlet passage, and means for controlling liquid flow through the liquid supply passage received in the opening.

30. A mist generating apparatus as recited in claim 24, the block further comprising a front face and a bottom face, the front face having a bore opening through to the bottom face.

31. A mist generating apparatus as recited in claim 24, the block further comprising a front face having an opening extending inwardly to the mist outlet passage for receiving a pressure relief valve.

32. A mist generating apparatus as recited in claim 24, the block further comprising a side face having an opening extending inwardly through the mixing passage and to the liquid inlet passage, and means for controlling liquid flow through the liquid, supply passage received in the opening.

33. A mist generating apparatus as recited in claim 24, the block further comprising a rear face and wherein the bore for receiving the liquid level detector passes through to a top face of the block, and the rear face has an opening extending inwardly to the bore for receiving and conveying power supply wires.

34. A mist generating apparatus as recited in claim 24, wherein the bore for receiving the liquid heater passes through to a top face of the block for receiving and conveying power supply wires.

35. An apparatus for generating a mist for use in a centralized, pressurized gas-driven mist generating system, the mist generating apparatus comprising:
- a frame member having
  - (a) a mist generating passage,
  - (b) a pressurized gas inlet passage, the pressurized gas inlet passage connecting with the mist generating passage, and
  - (c) a liquid inlet passage, the liquid inlet passage connecting with the mist generating passage;
  - (d) means for generating mist disposed in the mist generating passage; and
  - (e) means for relieving excess gas pressure disposed in the mist generating passage,
- a reservoir sealingly secured against the frame member for containing the liquid supply, the reservoir having a plurality of mounting ports for the frame member, and
- a plurality of frame members connected to the mounting ports, wherein the plurality of frame members comprises a first frame member for generating mist, and a second frame member having a liquid level detector and liquid reservoir filling port.

36. An apparatus for generating a mist for use in a centralized, pressurized gas-driven mist generating system, the mist generating apparatus comprising:

a frame member having
- (a) a mist-generating passage,
- (b) a pressurized gas inlet passage, the pressurized gas inlet passage connecting with the mist generating passage, and
- (c) a liquid inlet passage, the liquid inlet passage connecting with the mist generating passage;
- (d) means for generating mist disposed in the mist generating passage; and
- (e) means for relieving excess gas pressure disposed in the mist generating passage, a reservoir sealingly secured against the frame member for containing the liquid supply, the reservoir having a plurality of mounting ports for the frame member, and a plurality of frame members connected to the mounting ports, wherein the plurality of frame members comprises a first frame member for generating mist, and a second frame member having an instrument for measuring an operating characteristic of the system.

37. An apparatus for generating a mist for use in a centralized, pressurized gas-driven mist generating system, the mist generating apparatus comprising:

a frame member having
- (a) a mist-generating passage,
- (b) a pressurized gas inlet passage, the pressurized gas inlet passage connecting with the mist generating passage, and
- (c) a liquid inlet passage, the liquid inlet passage connecting with the mist generating passage;
- (d) means for generating mist disposed in the mist generating passage; and
- (e) means for relieving excess gas pressure disposed in the mist generating passage, a reservoir sealingly secured against the frame member for containing the liquid supply, the reservoir having a plurality of mounting ports for the frame member, and a plurality of frame members connected to the mounting ports, wherein the plurality of frame members comprises a first frame member for generating mist, and a second frame member having a heater.

* * * * *